United States Patent [19]

Kiefer et al.

[11] Patent Number: 5,486,363
[45] Date of Patent: Jan. 23, 1996

[54] PREPARATION OF CHOLINE CHLORIDE-CONTAINING POWDERS, THESE POWDERS, AND THEIR USE

[75] Inventors: Hans Kiefer, Neustadt; Roland Betz, Niederkirchen; Wolfgang Bewert, Frankenthal, all of Germany

[73] Assignee: BASF Aktiengesellschaft, Ludwigshafen, Germany

[21] Appl. No.: 342,026

[22] Filed: Nov. 16, 1994

Related U.S. Application Data

[63] Continuation of Ser. No. 67,810, May 27, 1993, abandoned.

[30] Foreign Application Priority Data

Jun. 6, 1992 [DE] Germany ............. 42 18 768.0

[51] Int. Cl.⁶ .................................................. A23K 1/165
[52] U.S. Cl. .................... 424/442; 424/489; 424/439
[58] Field of Search ........................... 424/489, 439, 424/442, 438, 490

[56] References Cited

U.S. PATENT DOCUMENTS

| | | | |
|---|---|---|---|
| 3,949,070 | 4/1976 | Arai et al. | 424/118 |
| 4,065,557 | 12/1977 | Frommer et al. | 514/35 |
| 4,519,961 | 5/1985 | Schumacher et al. | 264/4.6 |
| 4,948,589 | 8/1990 | Iijima et al. | 424/442 |
| 4,962,094 | 10/1990 | Jamas et al. | 514/54 |

FOREIGN PATENT DOCUMENTS

| | | |
|---|---|---|
| 985893 | 9/1972 | Canada . |
| 2151076 | 4/1973 | France . |
| 2174170 | 10/1973 | France . |
| 1932536 | 1/1971 | Germany . |
| 2554032 | 6/1977 | Germany . |
| 1161970 | 8/1969 | United Kingdom . |
| 1168444 | 10/1969 | United Kingdom . |
| 1412204 | 10/1975 | United Kingdom . |

OTHER PUBLICATIONS

Patent Abstracts of Japan, vol. 011, No. 075 (C–408), Mar. 6, 1987 (English abstract of JP–A 61 230 729).

Patent Abstract of Japan, vol. 013, No. 095 (C–573), Mar. 6, 1989 (English abstract of JP–A 63 274 445).

Derwent Abstracts, Database WPI, Week 8609, AN 86–061191 (English abstract of SU–A 1 172 920).

Die Muhle und Mischfuttertechnik 114, (1977), 3.

*Primary Examiner*—Thurman K. Page
*Assistant Examiner*—William E. Benston, Jr.
*Attorney, Agent, or Firm*—Keil & Weinkauf

[57] ABSTRACT

In a process for preparing dry, free-flowing choline chloride-containing powders by atomizing an aqueous choline chloride solution, a colloid-free aqueous choline chloride solution is atomized in a countercurrent-flowing air stream that contains, finely dispersed, a hydrophobic spraying auxiliary metered in in such amounts that the sprayed choline chloride droplets are coated with 2 to 15% by weight of spraying auxiliary, based on choline chloride calculated as 100%, and the coated particles are, if desired, collected in a fluidized bed and dried in the gas stream.

5 Claims, No Drawings

PREPARATION OF CHOLINE CHLORIDE-CONTAINING POWDERS, THESE POWDERS, AND THEIR USE

This application is a continuation of application Ser. No. 08/067,810, filed on May 27, 1993, now abandoned.

Choline chloride is used in large amounts as a feed additive in animal rearing and in the fattening of pigs and poultry.

However, the pure substance is an extremely hygroscopic powder. Anhydrous samples obtained by crystallization from organic solvents or by evaporation consequently become deliquescent within a few hours on standing in the atmosphere.

On account of this property, anhydrous choline chloride cannot be used directly in premixes or directly in animal feeds, since the latter agglomerate on contact with the atmosphere and no longer exist in the required free-flowing form.

In the prior art this problem is solved in two different ways.

In the first variant the generally 75 to 78% strength solution of choline chloride normally formed in the synthesis is sprayed onto a sorptive inorganic carrier. Finely divided silicic acid, for example (SIPERNAT® S22 from Degussa), has proved suitable for this purpose. In this connection the adsorption capacity is not fully utilized, so that when the adsorbate stands in air it does not quickly agglomerate and form lumps due to adsorption of atmospheric moisture. Free-flowing adsorbate with a choline chloride content of 50% is thus available on the market.

In the second technical solution a natural carrier such as wheat grit or maize spindle flour is used as carrier. Since however these organic carriers have a much smaller adsorption capacity than finely divided silicic acid, free-flowing dry products are obtained only if the adsorption is carried out under drying conditions. For this purpose the organic carrier is impregnated with only small amounts of choline chloride solution and is then dried. In order to obtain a 50% product in this way, the impregnating and drying procedure must be repeated at least 10 to 15 times if the process is carried out in a batchwise manner.

However, adsorbates on inorganic carriers and dry products based on natural carriers have serious disadvantages.

In contact with moist air or moist products such as feeds (water content of wheat for feeds is for example 10 to 14%) or in premixes, which normally contain trace elements in the form of salts containing water of crystallization, both products very rapidly adsorb water. They form lumps or agglomerate, with the result that storage and necessary metering are seriously impaired or even become impossible.

It is an object of the present invention to provide choline chloride powders with a high content of choline chloride to be obtained, without having to take account of the above-mentioned disadvantages.

We have found that this object is achieved according to the invention by a process for preparing dry, free-flowing choline chloride-containing powders by atomizing an aqueous choline chloride solution and if desired collecting the sprayed particles in a fluidized bed, wherein a colloid-free aqueous choline chloride solution is atomized in a countercurrentwise-flowing air stream that contains, finely dispersed, a hydrophobic spraying auxiliary metered in in such amounts that the sprayed choline chloride droplets are coated with 2 to 15% by weight of spraying auxiliary, based on choline chloride calculated as 100%, and the coated particles are, if desired, collected in a fluidized bed and dried in the gas stream.

In this connection it is surprising that these simple measures enable the successful preparation of choline chloride-containing microgranules which remain dry and free-flowing even up to a choline chloride content of 97%.

Hydrophobic spraying auxiliaries which may be used are substances known per se which are permitted for use in the feeds and foodstuff industry, such as metal salts of medium to higher fatty acids having 12 to 20 carbon atoms, calcium stearate or hydrophobized starches. The hydrophobized spraying auxiliaries used are preferably silanized silicic acids, such as are described in "Die Mühle und Mischfuttertechnik" 114 (1977) 3. SIPERNAT® D17 from Degussa, Frankfurt, may be mentioned in particular.

The hydrophobic spraying auxiliary is generally used in an amount of from 1 to 15% by weight, especially from 2 to 8% by weight, based on choline chloride calculated as 100%. It is also possible to use additional, non-hydrophobic spraying auxiliaries, although this does not bring any advantages.

The aqueous choline chloride solution to be employed as starting material is expediently used in the form in which it is obtained in the synthesis, and is a 50 to 90%, generally a 60 to 80%, strength solution. Other choline chloride concentrations may however also be used for the new process.

In order to carry out the new process it is simply necessary to atomize the choline chloride solution, formed in the synthesis, in a spray chamber, preferably a spray tower, and to dry the droplets coated with the hydrophobic spraying auxiliary in a fluidized bed by contact with gas, for example with heated air.

In particular, the aqueous choline chloride solution is atomized together with an atomization aggregate in the spray tower, where air, if necessary heated to up to 50° C., flows in countercurrent to the atomized choline chloride solution and the spraying auxiliary is dispersed in this air.

The hydrophobic spraying auxiliary or mixture of various spraying auxiliaries is introduced together with some of the air, the air charged with the auxiliary expediently being introduced into the spray tower above the atomization aggregate, and conveniently in a tangential flow. Mechanical stress of the particles is largely avoided by the direct introduction into the spray zone.

The hydrophobic coating of the spraying auxiliary on the atomized particles that is produced during the spraying stabilizes the particles to such an extent that it prevents the latter clumping and agglomerating, and enables subsequent drying in a fluidized bed.

This drying expediently takes place in a separate drying zone in which the water still remaining in the coated droplets is removed in the fluidized bed.

In principle however it is also possible, by a suitable choice of the amount of air and its temperature, to remove a large proportion or even all the water to a residual content of 0.5 to 1% in the product even before it leaves the spray tower. In the latter case the inflow temperature for the gas is preferably 140° C. Furthermore, in order to prepare products largely freed from water, a sufficiently long residence time of the particles to be dried in the spray tower is necessary. Long, narrow spray towers are therefore preferably used, towers having a length of 20 to 30 m being preferred for use on an industrial scale. Excess spraying auxiliary is separated from the drying gas stream by means of a cyclone or filter and is returned to the spray tower.

In general the temperature of the air flowing in countercurrent to the atomized solution is maintained in the range from 20 to 170° C.

The choline chloride solution to be atomized is expediently heated to from 20 to 50° C. before the atomization; it may however equally be atomized at room temperature.

The formation of the atomization aggregate has no decisive influence on the product. The dispersion of the choline chloride solution may for example be effected by nozzles or rapidly rotating atomizing disks.

The novel process gives dry, free-flowing powders generally having a particle size of 150 to 300 nm, which differ from products of the previously known processes by the following properties:

1. Higher choline chloride concentrations of up to 97% by weight are possible.
2. Higher stability with regard to water absorption and lump formation, even under unfavorable conditions.
3. Free-flowing, finely particulate powder that can easily be uniformly distributed in the feed, but is however not so fine that it forms dust during production and processing.

Although choline chloride powder with a high choline chloride content can be successfully prepared in a simple way by the process according to the invention, the choline chloride concentration in the powder can if desired be adjusted to the commercially normal concentrations of, for example, 50% by the co-use of further inert bulking agents.

For this purpose an inert bulking agent such as calcium carbonate is for example dispersed in the choline chloride solution and this dispersion is sprayed using the method according to the invention. Depending on the amount of bulking agent the choline chloride concentration in the finished powder can be adjusted to any arbitrary value.

The preparation of dry powders, in particular of oil-soluble vitamins, is known from EP 74 050, according to which a colloid dispersion of the vitamin is atomized and the particles are brought into contact with hydrophobic spraying auxiliaries and the particles are then collected in a fluidized bed and dried.

Although the measures employed in the process of the abovementioned patent and in the present process are very similar, the objective and solution are completely different.

Whereas the aim in the atomization of vitamins is to coat the latter with a colloid and the hydrophobic spraying auxiliary simply serves to ensure that the colloid particles do not agglomerate on their path to the fluidized bed in which they are dried, and the vitamin is protected against attack from atmospheric oxygen by the colloid coating, in the present case the extremely hygroscopic choline chloride is effectively protected against atmospheric moisture by the relatively small amount of the hydrophobic spraying auxiliary, although in this case there may be no coherent gas-impermeable coating such as occurs for example with a colloid coating. It is therefore surprising that the desired effect actually occurs, even in the case of a 95% powder.

EXAMPLE 1

500 g of aqueous choline chloride solution containing 75% by weight of choline chloride were sprayed at 23° C. with an inlet nozzle at 5 bar in a spray tower into a cloud comprising air charged with hydrophobic silicic acid (SIPERNAT®D17, DEGUSSA). The resultant, still moist product was dried in a fluidized bed drier at 70 to 80° C. in an air stream to a residual moisture content of 1.0% by weight. The excess silicic acid was separated at the same time. The $SiO_2$ content of the obtained powder was found to be 2.7% by weight; the total yield was 360 g of a product with an active substance content of 95.8% by weight.

EXAMPLE 2

A mixture consisting of 560 g of a 70% by weight aqueous choline chloride solution and 137 g of corn starch was sprayed, as described in Example 1, at 40° C. into a cloud of hydrophobic silicic acid. The resultant product was dried at 80° C. in a fluidized bed drier to a residual moisture content of 1.3% by weight. The $SiO_2$ content of the obtained powder was 4.0% by weight, and the total yield was 485 g, with an active substance content of 72.0%.

We claim:

1. A process for preparing dry, free-flowing, choline chloride-containing powders which comprises: atomizing a colloid-free aqueous choline chloride solution in a counter-current-flowing air stream that contains a hydrophobic spraying auxiliary powder finely dispersed in the air stream in an amount such that the sprayed choline chloride droplets are coated with 2 to 25% by weight of spraying auxiliary powder, based on choline chloride calculated as 100%, said hydrophobic spraying auxiliary being a silanized silicic acid or a salt of a medium to relatively long chain fatty acid, and thereafter drying the coated droplets to form a free-flowing choline chloride-containing powder.

2. A process as defined in claim 1, wherein a 50 to 90% aqueous choline chloride solution is used.

3. A process as defined in claim 1, wherein the hydrophobic spraying auxiliary is introduced into the spray tower above the atomization of the choline chloride solution.

4. A process as defined in claim 1, wherein the coated droplets are collected in a fluidized bed and dried in a gas stream.

5. A process as defined in claim 1, wherein the coated droplets are dried to form particles having a diameter of from about 150 to about 300 nm.

* * * * *